Aug. 26, 1930.                A. W. JOHNSON                1,774,015
                         OIL AND GASOLINE REGISTER
                            Filed Oct. 13, 1928

Inventor
A. W. Johnson
By Watson E. Coleman
   Attorney

Patented Aug. 26, 1930

1,774,015

UNITED STATES PATENT OFFICE

ANDREW W. JOHNSON, OF KANSAS CITY, MISSOURI

OIL AND GASOLINE REGISTER

Application filed October 13, 1928. Serial No. 312,350.

This invention relates to a registering device designed particularly for the use of motorists to record the quantity of gasoline bought for the use of a motor vehicle and to keep track of the periods when a changing of the oil in the engine is necessary.

In addition to the foregoing an improved object of this invention is to provide an oil and gasoline register which may be conveniently mounted upon a motor vehicle to enable the operator thereof to make the necessary adjustments easily and quickly.

The invention broadly contemplates the provision of a casing having a removable top and having to groups of windows in the front thereof. Within the casing are mounted two groups or series of wheels each having its periphery provided with the numerals 1 to 0, the peripheral portion of each wheel being viewable through a window. Adjustable resilient elements are provided one for each wheel to maintain the wheel in set position.

With one group of wheels any numeral from 1 to 9999 may be shown and with this group the quantity of gasoline used is noted, the necessary adjustment being made each time a supply of gasoline is purchased to record the amount of adding it to the recorded amounts of previous purchases. The other group of number wheels is employed to indicate the point in the mileage of the vehicle to where a fresh supply of oil must be obtained, that is if the oil supply is to be changed after five hundred miles of running following the purchase of the machine, the register is set at 500 and when the mileage indicated upon the speedometer shows a mileage corresponding with that shown in the register, that is 500 miles, the machine operator knows that a fresh supply of oil must be obtained.

The invention will be best understood from a consideration of the following detailed description taken in connection with the accompanying drawing, with the understanding, however, that the invention is not confined to any strict conformity with the showing of the drawing but may be changed or modified so long as such changes or modifications marks no material departure from the salient features of the invention as expressed in the appended claims.

In the drawing:—

Figure 1:
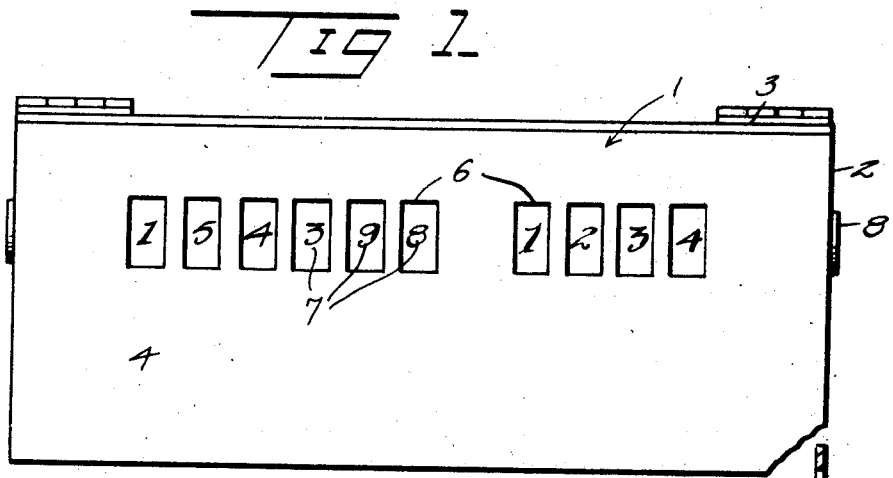
Figure 1 is a view in front elevation of the register embodying the present invention.
Figure 2:
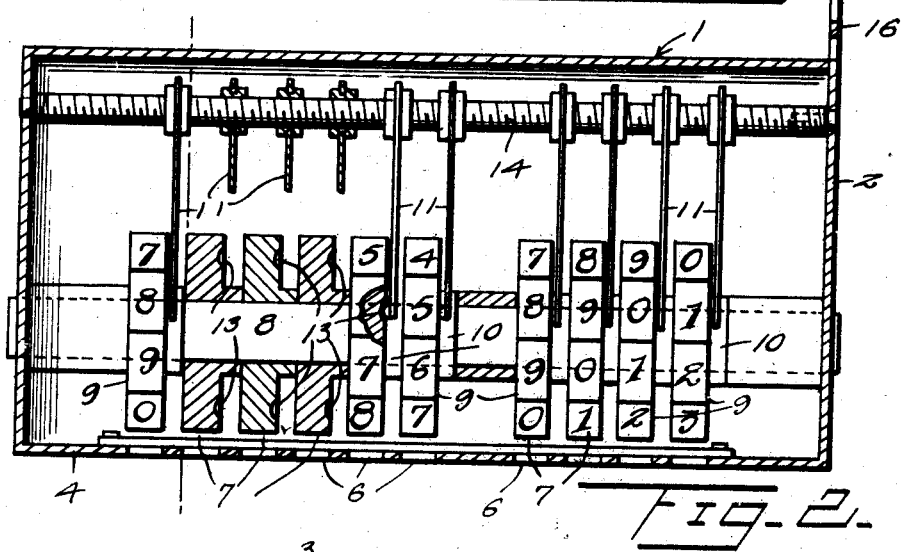
Figure 2 is a longitudinal horizontal section through the register showing certain of the wheels and spring devices in section.
Figure 3:
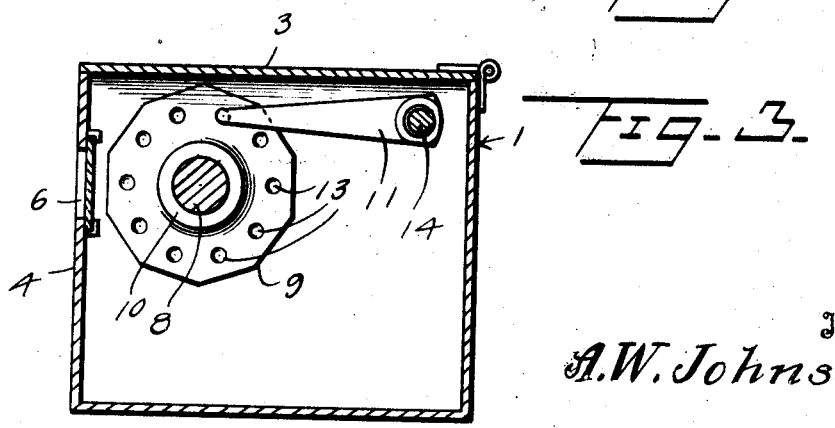
Figure 3 is a transverse sectional view taken on line 3—3 of Figure 2.

Referring to the drawing in detail wherein like numerals of reference indicate corresponding parts throughout the several views the numeral 1 indicates generally the register embodying the present invention, the same comprising as shown, an elongated casing 2 having a hinged top 3 and having the front wall or face 4 thereof provided with two groups of transversely extending windows 5 and 6 respectively, the wheels 7 of each group being arranged in relatively close relation in the manner shown.

In one group of windows, as for example, group 6, four windows are employed while in the other group six windows are employed. Extending longitudinally through the casing 2 is a smooth shaft 8 and mounted upon the shaft is a plurality of wheels 9. These wheels 9 are arranged upon the shaft in two groups, one group consisting of four wheels and arranged to have the peripheral surfaces of the wheels positioned to be viewed through the group of four windows while the other group of wheels is made up of six wheels and arranged so that their peripheral surfaces will be viewed through the group of six windows. The wheels 9 are each provided on one face with a collar 10 which acts to space the wheels sufficiently to permit the introduction therebetween of the tip of a spring member 11, this introduced tip of the spring having a lug 12 extending from one face which is designed to engage in one of an annular series of ten notches or recesses 13. Each of the wheels 9 has the face of the periphery thereof provided with the numbers 1 to 0 and there is a recess or notch 13 for each of these numbers.

Extending longitudinally through the casing 2 is a threaded shaft 14 and the other end of each of the spring arms 11 has swivelly attached thereto an interiorly threaded thimble 15 which is threaded on the shaft 14. Thus it will be seen that by adjusting the thimbles 15 longitudinally on the supporting shaft 14 the tension of the spring arms 11 may be increased or decreased upon their respective number wheels 9 as desired.

The windows 7 are, of course, to be covered by a suitable transparent body such as glass or the like so that the interior of the casing can be kept free from dust. In order to facilitate the mounting of the casing there is provided a pair of attaching ears 16 suitably apertured to receive supporting bolts (not shown).

From the foregoing description it will be readily seen that in using the present oil and gasoline register, the machine operator, each time a purchase of gasoline is made, will open the top 3 and rotate the series of four wheels showing through the window group 6 so as to indicate the amount of gasoline purchased or add the amount purchased to the amount already shown by the numbered wheels.

If the group of wheels shown through the window series 5 indicates for example 500 and the machine operator desires to note that the oil of the engine must be changed at the end of another five hundred miles of driving, or in other words when the speedometer of the machine registers 1000 miles, he adjusts the number wheels appearing through the window group 5 to show 1000. Then, when the mileage reading of the speedometer corresponds with the number appearing at the windows of group 5, the machine operator knows that the oil supply must be changed.

Having thus described my invention what I claim is:—

1. A register of the character described comprising a casing having a plurality of windows in one wall, a plurality of rotatably mounted wheels each having a series of numerals about the periphery thereof and each viewable through one of said windows, a resilient spring tongue adjustably mounted adjacent each wheel and engaging the wheel to maintain it in set position and means carrying the tongue and adjustable in a path parallel to the axis of rotation of the wheel to control the tension of the tongue.

2. A register of the character comprising a casing having a plurality of windows in one wall, a plurality of rotatably mounted wheels each having a series of numerals about the periphery thereof and each viewable through one of said windows, means for spacing said wheels, a series of spring tongues each engaging one side face of a wheel, means common to all of said tongues for supporting the same, and a connection between each tongue and the supporting means whereby it may be adjusted thereon to increase or decrease its tension on the adjacent wheel.

3. In a register of the character described, a casing having a series of windows opening through one wall thereof, a supporting shaft within the casing, a series of peripherally numbered wheels mounted upon said shaft and each viewable through a window, a threaded shaft within the casing, and a series of spring tongues each threadably mounted at one end upon the threaded shaft and having its other end engaging one side face of a wheel.

In testimony whereof I hereunto affix my signature.

ANDREW W. JOHNSON.